(12) United States Patent
Plaindoux et al.

(10) Patent No.: US 8,835,538 B2
(45) Date of Patent: *Sep. 16, 2014

(54) HEAT-PROTECTION MATERIAL

(75) Inventors: Cédric Plaindoux, Bordeaux (FR); Jean-Marc Bouilly, Saint Medard En Jalles (FR)

(73) Assignee: Astrium SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/642,824

(22) PCT Filed: Apr. 19, 2011

(86) PCT No.: PCT/EP2011/056268
§ 371 (c)(1),
(2), (4) Date: Dec. 7, 2012

(87) PCT Pub. No.: WO2011/131691
PCT Pub. Date: Oct. 27, 2011

(65) Prior Publication Data
US 2013/0207028 A1 Aug. 15, 2013

(30) Foreign Application Priority Data
Apr. 22, 2010 (FR) .................... 10 53087

(51) Int. Cl.
*C08L 97/00* (2006.01)
*B64G 1/58* (2006.01)
*F16L 59/04* (2006.01)
*C09K 5/18* (2006.01)

(52) U.S. Cl.
CPC ... *C09K 5/18* (2013.01); *B64G 1/58* (2013.01); *C08L 97/007* (2013.01); *F16L 59/04* (2013.01)

USPC ........................................... 524/16

(58) Field of Classification Search
USPC .......................................... 524/16
See application file for complete search history.

(56) References Cited

U.S. PATENT DOCUMENTS

| | | | |
|---|---|---|---|
| 2,087,942 A | 7/1937 | West | |
| 4,031,059 A | 6/1977 | Strauss | |
| 4,112,179 A * | 9/1978 | Maccalous et al. | ........... 428/325 |
| 4,204,899 A | 5/1980 | Walker et al. | |
| 5,064,868 A | 11/1991 | Simpson et al. | |
| 2001/0036505 A1 | 11/2001 | Kirby et al. | |
| 2005/0096414 A1 | 5/2005 | Cosby et al. | |

FOREIGN PATENT DOCUMENTS

| | | |
|---|---|---|
| CH | 274859 A | 4/1951 |
| EP | 1482163 A2 | 12/2004 |
| EP | 1493788 A1 | 1/2005 |
| GB | 879411 A | 10/1961 |

OTHER PUBLICATIONS

International Search Report dated Jul. 22, 2011.
Reculusa et al: "Formation of low-density carbon materials through thermal degradation of a cork-based composite", Carbon, Elsevier, Oxford, GB, vol. 44, No. 7, Jun. 1, 2006, pp. 1316-1320, XP025010899, ISSN: 0008-6223, DOI: DOI:10.1016/J.CARBON.2005.12.051 p. 1316, right-hand column, paragraph 2—p. 1320, left-hand column, paragraph 1.

* cited by examiner

*Primary Examiner* — Peter Szekely
(74) *Attorney, Agent, or Firm* — Perman & Green, LLP

(57) ABSTRACT

A heat protection material for a surface, made of a mixture comprising a resin, cork granules and refractory fibers, wherein the proportion of cork granules in the mixture is 50 to 80% by mass.

19 Claims, 4 Drawing Sheets

BD 1

BD 1

6

HEAT-PROTECTION MATERIAL

CROSS-REFERENCE TO RELATED APPLICATIONS

This application is the National Stage of International Application No. PCT/EP2011/056268 International Filing date, 19 Apr. 2011, which designated the United States of America, and which International Application was published under PCT Article 21 (s) as WO Publication WO 2011/131691 A1 and which claims priority from, and benefit of, French Application No. 1053087 filed on 22 Apr. 2010, the disclosures of which are incorporated herein by reference in their entireties The disclosed embodiment concerns heat protection materials of the type used in the field of aerospace. These materials are designed to protect structures or equipment from very high heat loads, during short periods not exceeding a few minutes.

These materials are required during phases of going through the atmosphere of planets, both on launch and re-entry.

They are also used as protection against the heat sources of launch or space vehicles, such as the propulsion units.

BACKGROUND

The natural heat insulation properties of cork, associated with a binding agent that resists high temperatures, makes its use possible in aerospace and military industries for such applications.

There are many realizations of heat protection materials; in particular: document US 2001/0036505 A1 concerns a porous composition comprising cork particles and a binding agent; document U.S. Pat. No. 4,204,899 concerns making an ablative heat protection material comprising finely divided cork and thermosetting resin; and document EP 1 493 788A1 describes an ablative heat protection material for entry into the atmosphere of a space vehicle comprising cork and silicone that can be projected onto a surface.

Document US2005/0096414 A1 describes a heat protection material comprising silicone resin, a silicone catalyst, cork, glass ecospheres and a silicone solvent, with 65.3 to 72.3 percent of silicone resin by mass.

One material used is also the material known under the EADS group's brand name NORCOAT.

This material comprises 100 parts by weight of 0.5 to 1 mm cork, 35 parts by weight of phenolic resin, a fungicide and a flame retardant.

SUMMARY

The objective of the disclosed embodiment is to realize a material that is optimized as to its performance by mass, in regards to a low flux application, of the order of 0.1 MW/m2 to 0.3 MW/m2, and to obtain a markedly less dense material than the materials currently used in this field.

The disclosed embodiment envisages as its applications protecting launchers from aerothermal heating and protecting the rear portions of atmospheric reentry vehicles.

More specifically, the disclosed embodiment proposes a heat protection material for a surface, made of a mixture comprising a resin, cork granules and refractory fibers; the proportion of cork granules in the mixture is 50 to 80% by mass.

Preferably, the proportion of cork granules is from 65 to 70% by mass.

More specifically, the resin is a resin with high coke content, with a percentage by mass in the mixture of 10 to 35%.

Preferably, the percentage by mass of resin in the mixture is between 20 and 25%.

Advantageously, the percentage by mass of refractory fibers is from 1 to 11%.

According to first variant, the percentage by mass of refractory fibers is between 9 and 11%.

According to second variant, the percentage by mass of refractory fibers is between 1 and 5%.

According to a first aspect of the disclosed embodiment, the resin is a phenolic resin.

According to a second embodiment, the resin is epoxy resin, with a percentage by mass in the mixture of 10 to 30%.

More specifically, the percentage by mass of epoxy resin in the mixture is between 20 and 25%.

The epoxy resin is, in particular, an epoxy resin with two ingredients having the same proportions by mass.

According to this second embodiment, the percentage by mass of refractory fibers in the mixture is advantageously between 10 and 15%.

Still within this context and more specifically, the percentage by mass of refractory fibers in the mixture is between 10 and 12%.

The material advantageously comprises a 0.5 to 1.5% percentage by mass of fungicide.

Preferably, the cork is flame-proofed cork.

The refractory fibers are advantageously carbon fibers.

Advantageously, the density of the material of the disclosed embodiment is between 0.25 and 0.35, with a preferred range of 0.25 to 0.30.

BRIEF DESCRIPTION OF THE DRAWINGS

Other features and advantages of the disclosed embodiment will become apparent in reading the following description aspects of the disclosed embodiment with drawings, which show.

DETAILED DESCRIPTION

The heat protection materials used in the context of aerospace missions are exposed to large heat load during short periods of time.

Materials to be projected onto the surfaces to be protected and sheet materials both exist; the disclosed embodiment concerns the sheet materials.

Because of their operating principle, these materials, particularly those that comprise cork, cannot be characterized according to criteria such as heat conductivity, heat capacity and diffusivity.

In addition, it is not possible to define a temperature to which they will be subjected; however, their conditions of use can be characterized by a law that expresses the heat flow applied as a function of time.

Figure 2:
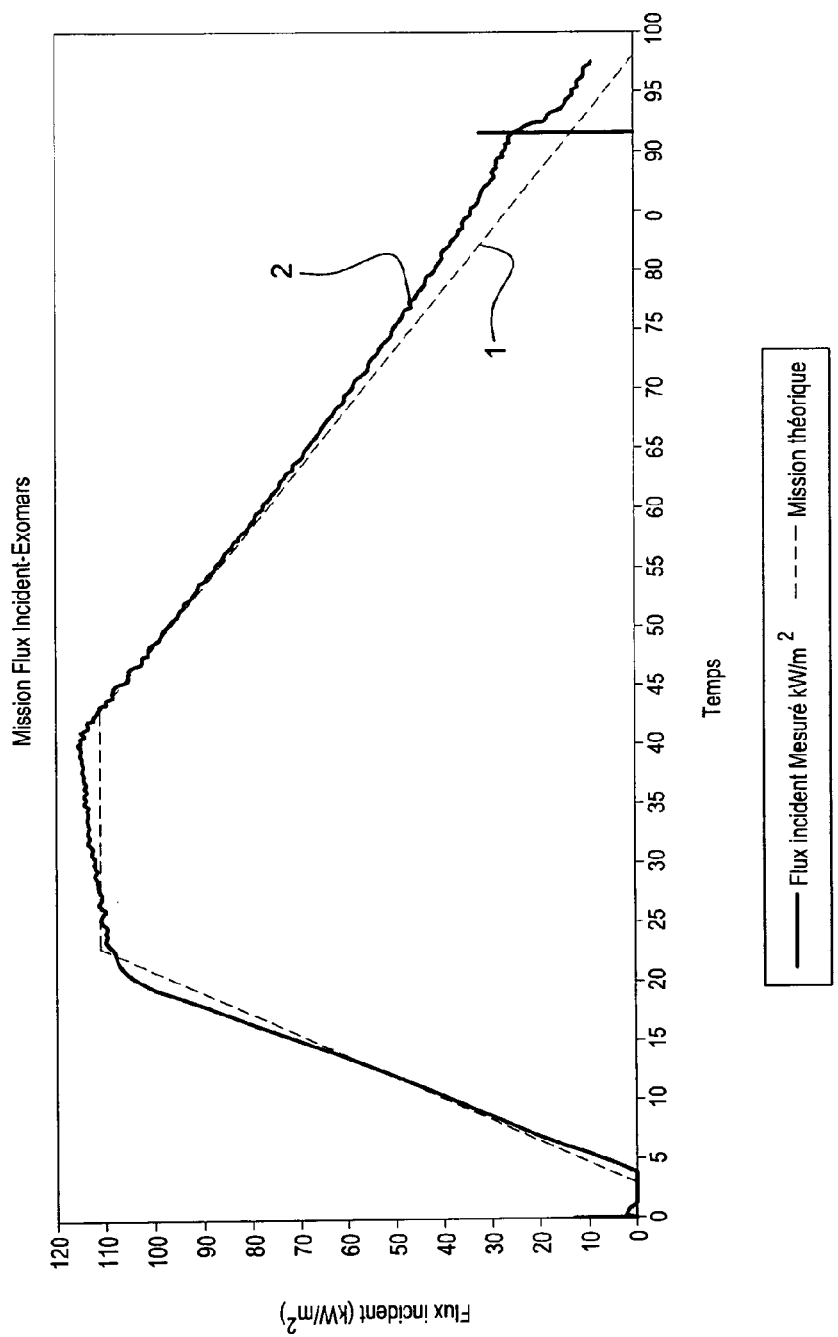
in FIG. 2: a curve that represents the incident flow as a function of the time applied during the simulation.

An example of an atmospheric reentry simulation is shown in FIG. 2.

The curve labeled 1 is the set point and the curve labeled 2 represents actual simulation.

When subjected to a heat flow caused by the friction of an atmosphere, heat protection materials react in transient fashion: they heat up by heat conduction and radiation, transmit the heat with their diffusivity and decompose.

Their surface that is exposed to the flow can also wear away little by little.

This last behavior, called "ablative", is fundamental for this type of materials because it helps to reduce the incoming heat flow.

The behavior of materials during this ablation must be such that the material that decomposes leaves a residue, called "crust", which remains in place at the surface of the material, this crust must remain in place despite the mechanical loads to which the material may be subjected, in particular vibrations and aerodynamic friction; also, particularly so as not to alter the aerodynamic profile of the object during its atmospheric travel, this crust must be uniform and have the least possible number of cracks; and the formation of this crust must occur with the smallest possible reduction in the surface area of the material, to preserve the material's insulating properties.

To optimize the materials and get the appropriate behavior from them, many parameters can be altered, with the aim of obtaining the smallest possible increase in temperature on the cold side of the material at the end of the space vehicle's mission, for the lowest possible protective mass.

One important optimization criterion for heat protection materials is their mass, because optimizing technical solutions in terms of their mass is an ever-present objective when building space vehicles or aircraft.

In effect, any mass gains on the structure allow either a larger payload or a reduction in the mass of propellant to be carried and possibly allow the mass of the support structure to be reduced.

The effects of reducing the mass are not just technical, they are also financial. It is already very important to reduce the mass of the vehicle on a launcher; it becomes even more so for a space probe that has to return to a planet after a journey in space.

Missions that require heat protection are characterized in terms of heat flow, of duration of temperature stress and also in terms of heat load, which corresponds to the total flow accumulated in the course of the mission.

The materials concerned by the disclosed embodiment are those destined to be used in low flux applications.

Low flow applications are applications in which the heat flows are of the order of 0.1 MW/m2 or less and of less than 10 MW/m2, with a total heat load less than 100 MJ/m2. This corresponds in particular to reentries onto small planets.

These weak flows are, for example, the aerothermal flows on a launcher, but also the flow over the rear portion of a reentry vehicle when the intensive flows are encountered on the forward shields of such vehicles or as protection from the propulsion flows.

The disclosed embodiment is particularly situated in the case of a heat flow less than or equal to 0.3 MW/m2.

In the context of finding a material suitable for weak heat flows, it was decided to search for solution with a high percentage of cork by mass to reduce the material's density.

These solutions use refractory fibers and, in particular, short carbon fibers.

The carbon fibers used are T300 carbon fibers with 6,000 filaments from Toray.

These fibers are crushed to shorten them to a length of between 0.5 and 3 mm.

The advantage of refractory fibers is their ability to withstand high temperatures, those above 1,000 or 1,500° C., in particular.

The cork used is in the form of granules and a binding agent is utilized to realize the material.

The binding agent used is a resin and, according to a first embodiment, it is a high coke content resin.

The coke content is the amount of carbon obtained when a material is heated to 1,000° C. in an inert atmosphere, e.g. nitrogen.

This measurement is performed with a traditional thermal analysis device, able to withstand 1,000° C. in nitrogen.

High coke content is a content greater than 50%.

It is generally obtained with resins that have aromatic cycles, such as phenolic, but also furan, bitumen and others.

According to a second embodiment, epoxy resin with low coke content is used.

Samples have been realized and, in the framework of the disclosed embodiment, two first materials using phenolic resin, called BD1 and BD6, and a second material using epoxy resin, called BD4, have been developed.

Four test samples, called BD1-1, BD1-2, BD6-1 and BD6-2, of the first material using phenolic resin were realized and tested.

The ambient conditions were: temperature 21° C.; humidity 54%.

The materials used comprise a 150×150 mm laboratory mold, i.e. 378.7 cc, an 8-liter capacity Kenwood kneader-mixer, a 50-250° C. electric drying oven and 3 Kg Viper electronic scales by Mettler.

The ingredients used to make the test material BD1 are described in the table below:

| Ingredients | supplier | PCM | Mass g |
|---|---|---|---|
| Flame-proofed 0.5/1 mm cork granules | Amorim-Hpk | 63.13 | 66.92 |
| Phenolic resin | Exxon | 22.9 | 24.3 |
| Carbon fibers | Apply-carbon | 13.09 | 13.9 |
| Fungicide | Borcher's | 0.88 | 0.93 |

The objective was to reach a density of the order of 280±10 kg/m3 for a mass of the order of 100 g.

The ingredients used to make the test material BD6 are described in the table below:

| Ingredients | supplier | PCM | Mass g |
|---|---|---|---|
| Flame-proofed 0.5/1 mm cork granules | Amorim-Hpk | 68.15 | 76.4 |
| Phenolic resin | Exxon | 27.1 | 30.4 |
| Carbon fibers | Apply-carbon | 3.8 | 4.26 |
| Fungicide | Borcher's | 0.95 | 1.06 |

The objective was to reach a density of the order of 280±10 kg/m3 for a mass of the order of 110 g.

The operating procedure for realizing the first sample, called BD1-1, is described in the table below:

| | |
|---|---|
| weighing the ingredients | 15 mins |
| mix the resin and fungicide in the mixer bowl | 1 min |
| add 16 g cork and mix for 30 seconds at speed 1 | 30 secs |
| retrieve the resin from the bottom of the bowl | 30 secs |
| add and mix in the remaining cork | 5 mins |
| blend in the carbon fibers, speed 1 | 4 mins |
| homogenize at speed 2 | 1 min |

-continued

| | |
|---|---|
| fill the mold with the mixture | 30 secs |
| compress until the mold is closed | 30 secs |
| place the mold in the drying oven and keep at 120° C. | 2 hrs |
| cool the mold at room temperature | 2 hrs |
| de-mold and check the specimen | 5 mins |

For the second sample BD1-2, blending in the carbon fibers at speed one was increased to 6 mins; homogenization at speed 2 was increased to 2 mins; the time during which the mold was kept in the drying oven at 120° C. was increased to reach 2 hrs 10 mins; in the same way, the time for cooling the mold at room temperature was extended to reach 2 hrs 30 mins.

Whereas the first sample BD1-1 had lumps after de-molding, the appearance of the BD1-2 sample was satisfactory.

The mass of the BD1-1 and BD1-2 samples after de-molding was 99.8 and 113.8 g respectively; their final mass were 100.7 and 113 g respectively.

Materials BD6-1 and BD6-2 were realized respectively using the same methods; the mass of these samples once de-molded was 112.1 and 113.2 g respectively, and their appearance was satisfactory.

A second material, called BD4, using epoxy resin was perfected.

Trial samples were realized according to the following formulation:

| Ingredients: | Supplier | PCM | Mass g |
|---|---|---|---|
| Flame-proofed 0.5/1 mm cork granules: | Amorim-Hpk | 55.83 | 59.2 |
| Epoxy Resin Part A | 3M | 10.56 | 11.2 |
| Epoxy Resin Part B | 3M | 10.56 | 11.2 |
| Ethyl acetate | Hpk | 10.79 | 11.4 |
| Carbon fibers | Apply-carbon | 11.57 | 12.26 |
| Fungicide | Borcher's | 0.69 | 0.73 |

As for the first material, the objective was to reach a density of the order of 280±10 kg/m3 for a mass of the order of 100 g.

The operating procedure for realizing the two samples, BD4-1 and BD4-2, of the second material is described in the table below:

| | BD4-1 | BD4-2 |
|---|---|---|
| weighing the ingredients. | 15 mins | |
| mix the epoxy resin parts A and B in the mixer bowl. | 2 mins | |
| add the solvent and the mixture until completely dissolved | 5 mins | |
| add 16 g cork and mix at speed 1. | 30 secs | |
| retrieve the resin from the bottom of the bowl. | 30 secs | |
| add and mix in the remaining cork. | 5 mins | |
| blend in the carbon fibers, speed 1. | 4 mins | |
| homogenize at speed 2 | 1 min | |
| fill the mold with the mixture | 30 secs | |
| compress until the mold is closed. | 30 secs | |
| keep the mold in the drying oven at 120° C. | 2 hrs | 2 h 50 min |
| cool the mold at room temperature. | 2 hrs | |
| de-mold and check the specimen | 5 mins | |

The appearance of the two samples obtained is correct; the mass of the samples BD4-1 and BD4-2 after de-molding is 92.2 and 92.5 g, respectively; the final mass of the samples was 94.7 and 95 g, respectively.

The mass of acetate in the finished samples is missing because the acetate evaporated during polymerization.

In summary: the start proportions of the chosen materials are in the table below, in which the boxes marked with an "X" indicate that the ingredient in question is absent.

| Ingredients | BD1 (% by mass) | BD4 (% by mass) | BD6 (% by mass) |
|---|---|---|---|
| Phenolic resin | 20-25 | X | 25-30 |
| Epoxy resin | X | 18-23 | X |
| Ethyl acetate | X | 10-11 | X |
| Flame-proof cork | 60-65 | 50-60 | 65-70 |
| Short carbon fibers | 12-15 | 10-15 | 3-5 |
| Fungicide | 0.7-0.9 | 0.6-0.8 | 0.8-1.0 |

Consequently, low density materials are obtained, which comprise a large proportion of cork.

As regards the density, conductivity and diffusivity characteristics in comparison with those of the commercially available material Norcoat, the table below shows that the conductivity and diffusivity characteristics are very close to those of the prior art, whereas the density of the materials according to the disclosed embodiment is clearly lower than the density of the known material, i.e. 0.3 in comparison with 0.45 for the NORCOAT material.

| | BD1 | BD4 | BD6 | Norcoat commercially available |
|---|---|---|---|---|
| Density (material not degassed) | 0.28 | 0.26 | 0.28 | 0.47 |
| Density (degassed material) | 0.26 | 0.24 | 0.26 | 0.45 |
| Conductivity 20° C.(W/m · ° C.) | 0.16 | 0.13 | 0.15 | 0.1 |
| Diffusivity 20° C. 10−6 m2/s | 0.17 | 0.17 | 0.17 | 0.083 |

In the end, even though the thermal behavior of the BD4 material is equivalent to that of the BD1 material, BD1 will be preferred, because the epoxy binding agent of the BD4 material gives a more crackled surface than that of BD1.

The results for material BD6 are intermediate in comparison to the two other materials.

As regards the density of the material, the desired density is between 0.25 and 0.35 and preferably between 0.25 and 0.30.

The density can be adjusted by filling the mold more or less full and by adjusting the pressing according to the desired density.

Figure 1:
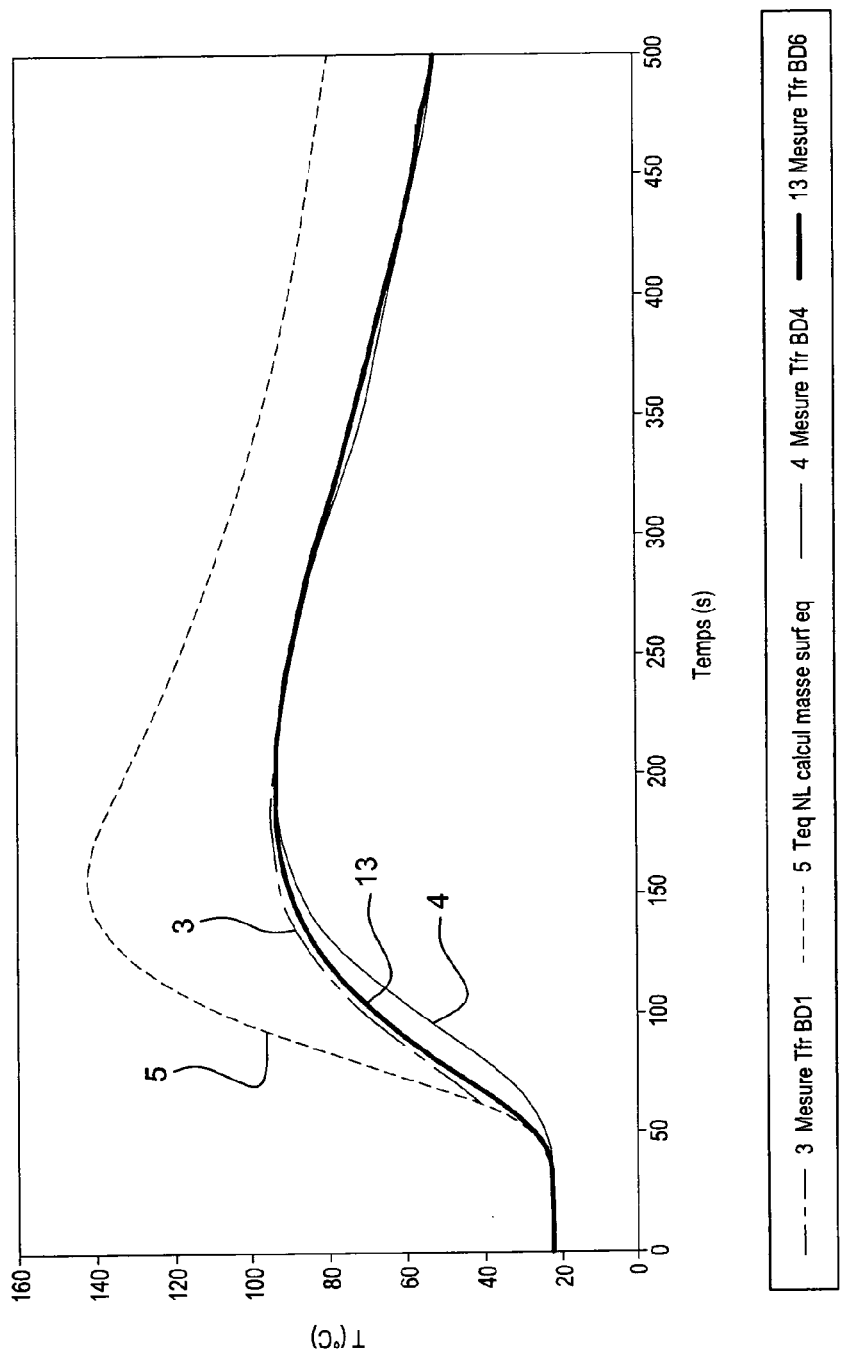
in FIG. 1: The temperature curves of a cold wall covered by the materials to be tested during a mission simulation under infrared radiation.

FIG. 1 is a comparison for equal mass of the cold wall temperatures for different materials; the cold wall is the one to be protected.

The curve labeled 3 is the cold wall temperature for material BD1; the curve labeled 13 is the cold wall temperature for material BD6; and the curve labeled 4 is the cold wall temperature for material BD4.

The curve labeled 5 is the temperature obtained with the NORCOAT material of the prior art.

On this figure, it should be noted that the new materials make it possible, for equal mass, to gain more than 40° C. over the cold side temperature of the protection compared with the previous material, curve 5.

Figure 3:
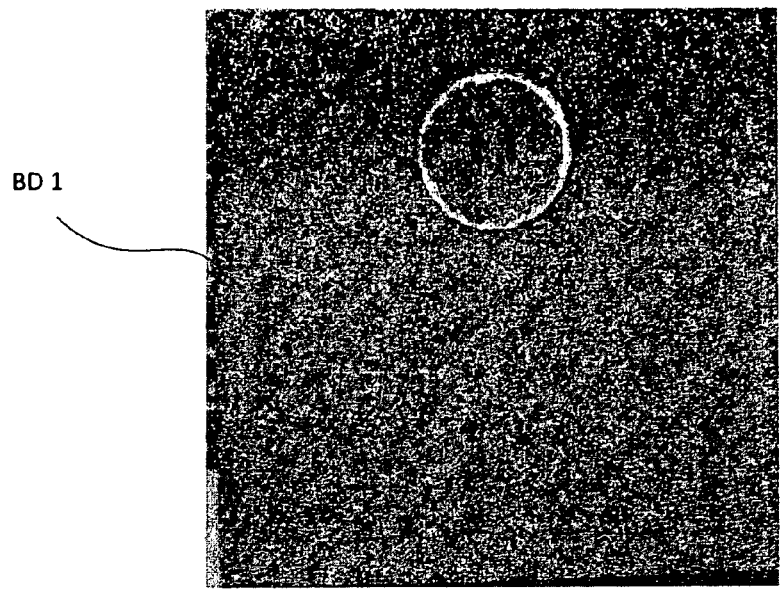
in FIGS. 3 and 4: photos of a first material before and after a mission simulation.
Figure 4:
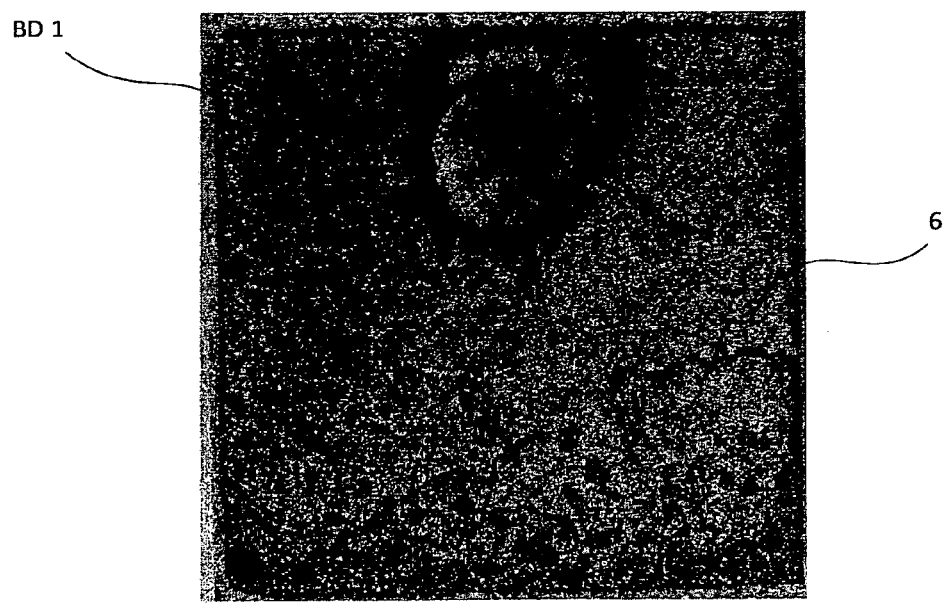

FIG. 3 is a view of material BD1 before testing; FIG. 4 is a view of this same material after testing.

The difference in appearance reflects the creation of the crust mentioned above; the sample is finely crackled. A few cracks 6 are present; this does not affect the protection provided by the material negatively.

Figure 5:
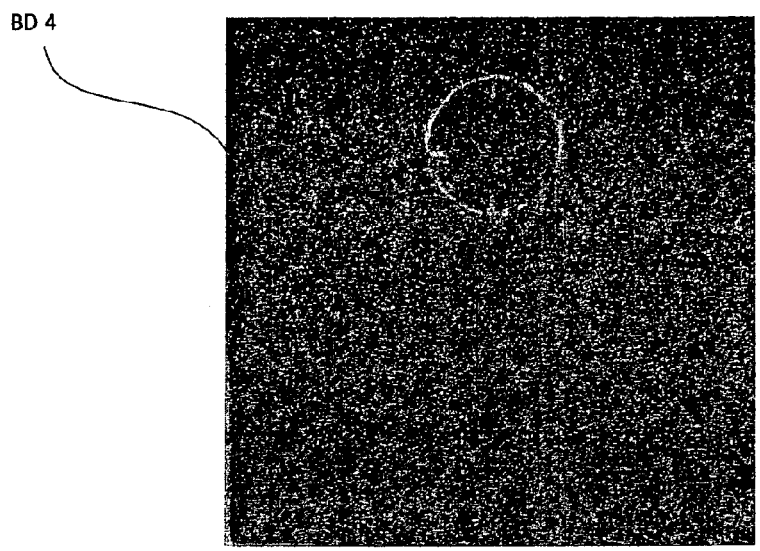
in FIGS. 5 and 6: photos of a second material before and after a mission simulation.
Figure 6:
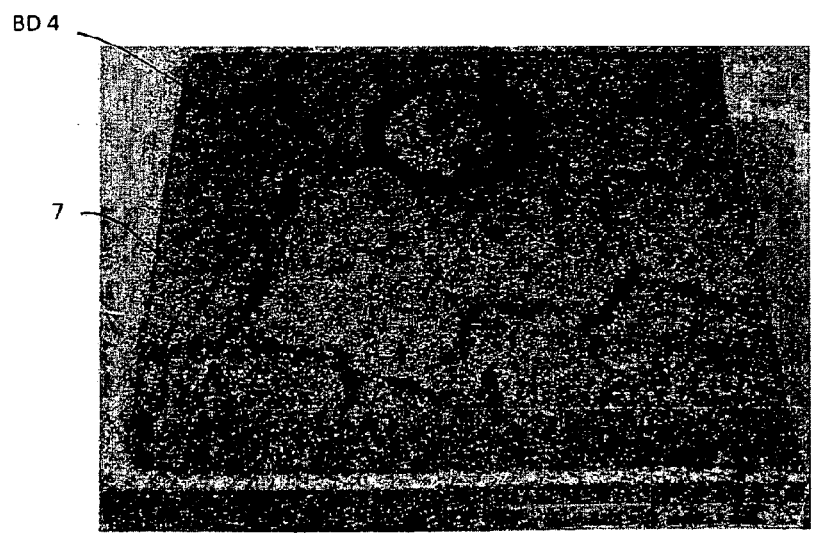

FIG. 5 is a view of material BD4 before testing; FIG. 6 is a view of this same material after testing.

Material BD4 shows larger cracks 7 after testing than material BD1 and its appearance is much more crackled than this last material.

Material BD6 has an intermediate state of cracking between that of material BD1 and that of material BD4.

To summarize, materials BD1 and BD6, which meet the objective of protection with a reduced mass, define a preferred range for the percentage by mass of phenolic resin in the mixture of between 20 and 30%, preferably between 22 and 28%.

Over and beyond the initial application of realizing heat protection for space vehicles, the disclosed embodiment can find numerous other applications as heat protection in the fields of rail, sea, air and ground transportation, in the field of industry, such as machinery, in the field of construction, such as fire-retardant protection.

The invention claimed is:

1. Ablative heat protection material for protecting a surface from heat, realized using a mixture comprising a resin, cork granules and carbon fibers, wherein the ablative heat protection material is designed for flows, from 0.1 to 0.3 MW/m2;
   wherein the proportion of cork granules in the mixture is a percentage of 50 to 80% by mass;
   the density of the material is reduced to a value of the order of 0.25 to 0.35 kg/l and wherein the resin is an epoxy resin or a phenolic resin with a percentage by mass in the mixture of 10 to 35% so that resin, cork, and carbon fibers form in excess of 85% of said material.

2. Ablative heat protection material according to claim 1, wherein the proportion of cork granules is from 65 to 70% by mass.

3. Ablative heat protection material according to claim 1, wherein the percentage by mass of resin in the mixture is between 20 and 25%.

4. Ablative heat protection material according to claim 1, wherein the percentage by mass of carbon fibers is between 1 and 11%.

5. Ablative heat protection material according to claim 4, wherein the percentage by mass of carbon fibers is between 9 and 11%.

6. Ablative heat protection material according to claim 4, wherein the percentage by mass of carbon fibers is between 1 and 5%.

7. Ablative heat protection material according to claim 1, wherein the resin is phenolic resin.

8. Ablative heat protection material according to claim 1, wherein the resin is an epoxy resin, with a percentage by mass in the mixture of 10 to 30%.

9. Ablative heat protection material according to claim 8, wherein the percentage by mass of epoxy resin in the mixture is between 20 and 25%.

10. Ablative heat protection material according to claim 8, wherein the epoxy resin is two components resin, said components having the same proportions by mass.

11. Ablative heat protection material according to claim 1, wherein the percentage by mass of carbon fibers in the mixture is between 10 and 15%.

12. Ablative heat protection material according to claim 11, wherein the percentage by mass of carbon fibers in the mixture is between 10 and 12%.

13. Ablative heat protection material according to claim 1, comprising 0.5 to 1.5% percentage by mass of fungicide.

14. Ablative heat protection material according to claim 1, wherein the cork is flame-proofed cork.

15. Ablative heat protection material according to claim 1, wherein the carbon fibers have a length between 0.5 to 3 mm.

16. Ablative heat protection material according to claim 1, having a density after degassing is between 0.25 and 0.30 kg/l.

17. Ablative protection material according to claim 1 comprising a mass percentage of cork between 60 and 65%, a percentage of carbon fibers between 12 and 15% and comprising phenolic resin.

18. Ablative protection material according to claim 1 comprising a mass percentage of cork between 65 and 70%, a percentage of carbon fibers between 3 and 5% and phenolic resin.

19. Ablative protection material according to claim 1 comprising a mass percentage of cork between 40 and 60%, a percentage of carbon fibers between 10 and 15% and epoxy resin.

* * * * *